United States Patent
Schäfer

(10) Patent No.: US 11,299,194 B2
(45) Date of Patent: Apr. 12, 2022

(54) STEER-BY-WIRE SYSTEM AND METHOD FOR OPERATING A STEER-BY WIRE SYSTEM

(71) Applicant: Volkswagen Aktiengesellschaft, Wolfsburg (DE)

(72) Inventor: Johannes Maria Schäfer, Berge (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 183 days.

(21) Appl. No.: 16/642,889

(22) PCT Filed: Jul. 5, 2018

(86) PCT No.: PCT/EP2018/068254
§ 371 (c)(1),
(2) Date: Feb. 27, 2020

(87) PCT Pub. No.: WO2019/048104
PCT Pub. Date: Mar. 14, 2019

(65) Prior Publication Data
US 2020/0346686 A1    Nov. 5, 2020

(30) Foreign Application Priority Data

Sep. 5, 2017   (DE) .......................... 102017215593.0

(51) Int. Cl.
*B62D 5/04* (2006.01)
*B62D 5/00* (2006.01)
(Continued)

(52) U.S. Cl.
CPC ........... *B62D 5/0463* (2013.01); *B62D 5/006* (2013.01); *B62D 6/008* (2013.01); *B62D 15/025* (2013.01)

(58) Field of Classification Search
CPC ...... B62D 5/0463; B62D 5/006; B62D 6/008; B62D 15/025
See application file for complete search history.

(56) References Cited

U.S. PATENT DOCUMENTS 4,753,308 A * 6/1988 Noto .................... B62D 5/0463
180/446
5,908,457 A * 6/1999 Higashira .............. B62D 6/008
701/41
(Continued)

FOREIGN PATENT DOCUMENTS

CN        1743216 A      3/2006
DE        19912169 A1    7/2000
(Continued)

OTHER PUBLICATIONS

PCT/EP2018/068254. International Search Report (dated Oct. 22, 2018).
(Continued)

*Primary Examiner* — Tony H Winner
*Assistant Examiner* — Michael R Stabley
(74) *Attorney, Agent, or Firm* — Loza & Loza, LLP; Peter Zura

(57) ABSTRACT

The invention relates to a steer-by-wire system, that includes a steering mechanism, a sensor for detecting a driver request, a steering control device, power electronics, an electric servomotor, a steering rack that can be moved by the servomotor and an actor for generating a feedback torque (MFF) at the steering mechanism as a function of a steering rack position, wherein the steering control unit is configured in such a way so as to subtract, based on the feedback torque (MFF), at least a portion from a driver request determined based on sensor data, and a method for operating a steer-by-wire system.

18 Claims, 2 Drawing Sheets

(51) Int. Cl.
*B62D 6/00* (2006.01)
*B62D 15/02* (2006.01)

(56) References Cited

U.S. PATENT DOCUMENTS

| | | | | |
|---|---|---|---|---|
| 7,530,422 | B2* | 5/2009 | Bolourchi | B62D 5/008 |
| | | | | 180/406 |
| 7,617,033 | B2* | 11/2009 | Katou | B62D 5/006 |
| | | | | 180/443 |
| 8,874,316 | B2* | 10/2014 | Kariatsumari | B62D 5/046 |
| | | | | 701/41 |
| 9,533,703 | B2* | 1/2017 | Shimizu | B62D 5/046 |
| 2006/0047391 | A1 | 3/2006 | Katou | |

FOREIGN PATENT DOCUMENTS

| | | |
|---|---|---|
| DE | 10321825 A1 | 12/2003 |
| DE | 10331700 A1 | 2/2004 |
| DE | 10359422 A1 | 7/2004 |
| DE | 102004001318 A1 | 8/2004 |
| DE | 102004001984 A1 | 8/2004 |
| DE | 102004025029 A1 | 1/2005 |
| DE | 102005041086 A1 | 3/2006 |
| JP | 2006062624 A | 3/2006 |
| JP | 4379261 B2 | 12/2009 |

OTHER PUBLICATIONS

CN Application No. 201880057646.X. Office action dated Sep. 13, 2021.

* cited by examiner

STEER-BY-WIRE SYSTEM AND METHOD FOR OPERATING A STEER-BY WIRE SYSTEM

RELATED APPLICATIONS

The present application is a 35 U.S.C. § 371 U.S. National Stage of International Patent Application No. PCT/EP2018/068254 filed Jul. 5, 2018, which claims priority under 35 U.S.C. § 119 to German Pat. App. No. DE 102017215593.0, titled "STEER-BY-WIRE SYSTEM AND METHOD FOR OPERATING A STEER-BY WIRE SYSTEM," filed Sep. 5, 2017, the contents of which are incorporated by reference in its entirety herein.

TECHNICAL FIELD

The invention relates to a steer-by-wire system and a method for operating a steer-by-wire system.

BACKGROUND

Steer-by-wire systems are typically characterized in that an input shaft that is connected to the steering means no longer includes a mechanical access, for example, to a steering rack that executes the steering motion. This also results in the loss of the haptic feedback from the roadway to the steering relative to the steering means. It is therefore known in the art to provide an actor for generating a feedback torque (e.g., an electric motor) that generates, inter alia, a countermomentum on the steering means as a function of the adjusted steering angle. In this, the steering angle is usually determined by means of the steering rack position.

Steer-by-wire systems of this kind are known in the art, for example, from DE 103 31 700 A1 or DE 10 2004 001 318 A1.

The invention is based on the technical problem of improving a steer-by-wire system and of providing an improved method for operating a steer-by-wire system.

SUMMARY

The solution to the technical problem is found in a steer-by-wire system and method that has the features specified in the present disclosure. Further advantageous configurations of the invention should be apparent to those skilled in the art.

Under the present disclosure, a steer-by-wire system may comprise a steering means or mechanism, a sensor for detecting a driver request, at least one steering control unit, power electronics, an electric servomotor, a steering rack that can be moved by means of the servomotor and an actor for generating a feedback torque at the steering means as a function of a steering rack position. Based on the steering rack position and including the axle geometry, the position of the wheels may be deduced of the motor vehicle. Then, at least a portion of the sensor data for determining the driver request is subtracted, based on a feedback torque in order to adjust the steering angle. The sensor may preferably be a torque sensor that detects a hand torque on the steering means. Alternatively, the sensor can also be an angle of rotation sensor. Preferably, the portion from the feedback torque is subtracted in full. This prevents a closed circuit from being formed due to the feedback torque in which the feedback torque is reinterpreted as a driver input.

According to an exemplary embodiment, the subtraction of the feedback torque may occur before or after a steering assistance determination. Torques can be very easily subtracted before the steering assistance determination.

According to a further exemplary embodiment, the steering control unit is configured to detect the requirements of a driver assistance system, wherein the requirements are intended to change a steering angle without generating haptic feedback on the steering means, wherein changes of the steering rack position that occur due to requirements during the determination of the feedback torques are subtracted.

According to a further exemplary embodiment, the steering control unit is configured to detect requirements of a driver assistance system, wherein the requirements influence the feedback torque, wherein the portion thereof is subtracted from the determined driver request. In extreme cases, the requirement of the driver assistance system can only consists of haptic feedback without influencing the steering angle (e.g., to generate vibration on the steering wheel to alert the driver).

Regarding the methods specified by the invention, reference is being made to the content of all the preceding remarks.

BRIEF DESCRIPTION OF THE FIGURES

The invention will be explained in further detail based on exemplary embodiments described below. The figures show.

DETAILED DESCRIPTION

Figure 1:
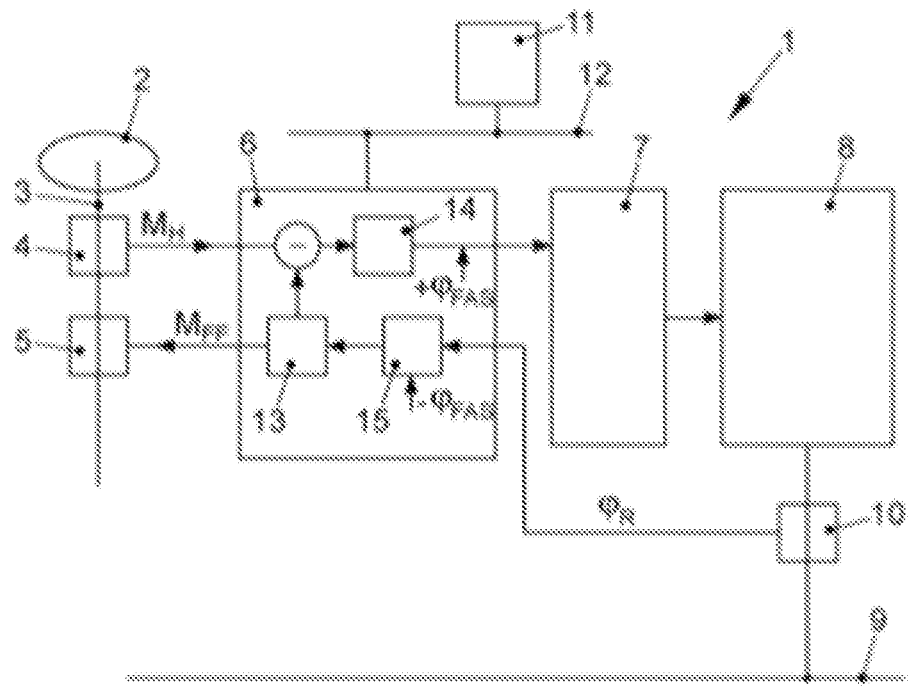
FIG. 1 shows a schematic block diagram of a steer-by-wire system of an exemplary embodiment.

The prior art will be explained briefly with reference to FIG. 3, before describing the invention in further detail.

The steer-by-wire system 1 comprises a steering means 2 that is connected to an input shaft 3. A torque sensor 4 for detecting a hand torque $M_H$ of the driver is disposed on the input shaft 3, as well as an actor 5 for generating a feedback torque $M_{FF}$ on the steering means 2. The steer-by-wire system 1 moreover comprises a steering control unit 6, power electronics 7 and an electric servomotor 8 that is connected to a steering rack 9, for example, by means of a ball-headed drive, which is not shown here. The electric servomotor 8 is provided with a rotor position sensor 10 whose rotor angle signal $\varphi_R$ can be used to recalculate the steering rack position. The steering control unit 6 determines, based on the hand torque $M_H$ and further input values, such as, for example, the vehicle speed, a steering angle that is to be adjusted by the servomotor 8. To this end, the steering control unit 6 generates a control signal S for the power electronics 7. This can cause the problem that the torque sensor 4 recognizes the feedback torque $M_{FF}$ as a new requested steering input, for example, because the driver has briefly removed his hands from the steering means 2. The new requested steering input results in return steering action to the neutral position, wherein, however, a new feedback torque $M_{FF}$ is generated that would steer back again, meaning that the steering could vibrate.

Figure 3:
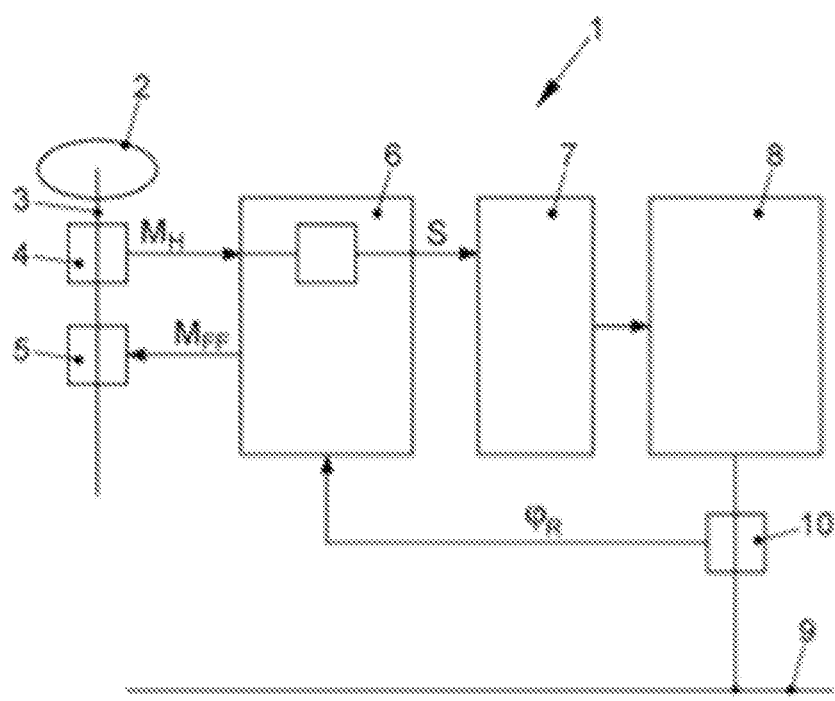
FIG. 3 is a schematic block diagram of a steer-by-wire system according to the prior art.

FIG. 1 depicts a steer- by-wire system 1 according to an exemplary embodiment, wherein identical elements are identified with the same reference signs as designated in FIG. 3. In addition, it is shown that the steering control unit 6 is connected to at least one driver assistance system 11 via a bus system 12. The steering control unit 6 includes a module 13 that calculates the feedback torque $M_{FF}$ which is to be implemented by the actor 5. This calculated feedback torque $M_{FF}$ is subtracted from the detected hand torque $M_H$, wherein it is possible to take into account a time delay. This torque $M_H$-$M_{FF}$ is then routed to a steering support function 14. The feedback torque $M_{FF}$ is determined therein based on the steering rack position that is determined in a module 15 from the rotor angle $\varphi_R$. Further assuming therein that the driver assistant system 11 generates a driver assistance system (FAS, or "Fahrerassistenzsystem") requirement that is intended to influence the steering angle but that is not intended to be haptically perceivable by the driver. In this case, said additionally desired steering angle $\varphi_{FAS}$ is added to the output of the steering support function 14 and subtracted in the module 15. This means that the driver does not receive haptic feedback for this portion, which in turn does not have to be considered for the hand torque $M_H$.

Figure 2:
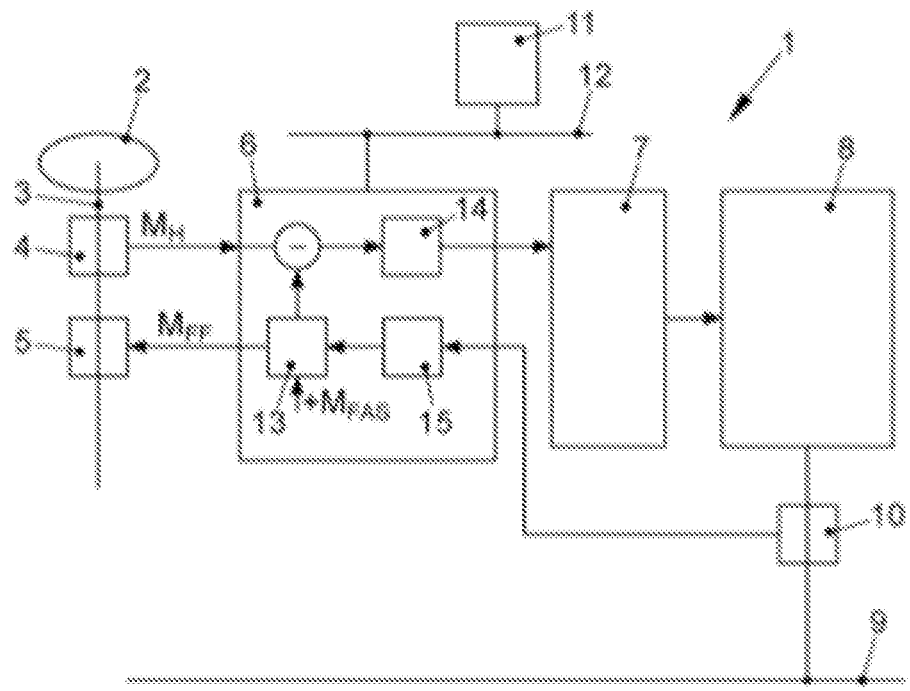
FIG. 2 shows a schematic block diagram of a steer-by-wire system of another exemplary embodiment.

FIG. 2 depicts a steer-by-wire system 1, wherein the driver assistant system 11 generates an FAS requirement that is intended to generate haptic feedback only on the steering means 2, but without influencing the steering angle. In this case, the additional reset torque $M_{FAS}$ is added. Said additional reset torque $M_{FAS}$ is simultaneously subtracted from the hand torque $M_H$ in the steering control unit 6. This way, the possibility of vibrating of steering is precluded, when the driver removes his hand from the steering means 2, because a hand torque $M_H$=0 is transmitted to the steering control unit 6.

CITATIONS THAT ARE CONTAINED IN THE DESCRIPTION

This list of documents provided by the applicant was generated electronically and has only been included for information. Said list is not part of the German patent and/or utility model application. The German Patent and Trademark Office (DPMA) is not liable for possible errors or omissions.
Cited Patent Literature
DE 10331700 A1 [0003]
DE 102004001318 A1 [0003]

The invention claimed is:
1. A steer-by-wire system, comprising:
a steering mechanism;
a sensor for detecting a steering request;
a steering rack, configured to be moved by a servomotor; and
an actor for generating a feedback torque ($M_{FF}$) at the steering mechanism as a function of a changeable steering rack position,
a steering control unit, configured to
  detect requirements (FAS) of a driver assistant system,
  determine a hand torque and the generated feedback torque, and
  subtract at least a portion of feedback torque ($M_{FF}$) from the hand torque ($M_H$) from the steering request to reduce haptic feedback on the steering mechanism.
2. The steer-by-wire system according to claim 1, wherein the subtraction occurs before or after a driver assistance function.
3. The steer-by-wire system according to claim 1, wherein the requirements (FAS) are configured to change a steering angle.
4. The steer-by-wire system according to claim 3, wherein changes ($\varphi_{FAS}$) to the steering rack position due to requirements (FAS) are subtracted for the determination of the feedback torque ($M_{FF}$).
5. The steer-by-wire system according to claim 1, wherein the steering control unit is configured to detect requirements (FAS) by a driver assistant system.
6. The steer-by-wire system according to claim 5, wherein the requirements (FAS) comprise a reset torque ($M_{FAS}$As) that is subtracted from the hand torque ($M_H$) by the steering control unit.
7. A method of operating a steer-by-wire system, comprising:
detecting, via a sensor, a steering request at a steering mechanism;
generating, via an actor, a feedback torque ($M_{FF}$) at the steering mechanism as a function of a changeable steering rack position;
detecting, via the steering control unit, requirements (FAS) of a driver assistant system;
determining, via a steering control unit, a hand torque and the generated feedback torque, ($M_{FF}$); and
subtracting, via the steering control unit, at least a portion of feedback torque ($M_{FF}$) from the hand torque ($M_H$) from the steering request to reduce haptic feedback on the steering mechanism.
8. The method according to claim 7, wherein the subtraction occurs before or after a driver assistance function.
9. The method according to claim 7, wherein the requirements (FAS) are configured to change a steering angle.
10. The method according to claim 9, wherein changes ($\varphi_{FAS}$) to the steering rack position due to requirements (FAS) are subtracted for the determination of the feedback torque ($M_{FF}$).
11. The method according to claim 7, further comprising detecting, via the steering control unit, requirements (FAS) by a driver assistant system.
12. The method according to claim 11, wherein the requirements (FAS) comprise a reset torque ($M_{FAS}$As) that is subtracted from the hand torque ($M_H$) by the steering control unit.
13. A method of operating a steer-by-wire system, comprising:
detecting, via a sensor, a steering request at a steering mechanism of a driver-assisted system;
detecting, via a steering control unit, requirements (FAS) of the driver-assisted system;
generating, via an actor, a feedback torque ($M_{FF}$) at the steering mechanism as a function of a changeable steering rack position;
determining, via the steering control unit, a hand torque and the generated feedback torque, ($M_{FF}$); and
subtracting, via the steering control unit, at least a portion of feedback torque ($M_{FF}$) from the hand torque ($M_H$) from the steering request to reduce haptic feedback on the steering mechanism.
14. The method according to claim 13, wherein the subtraction occurs before or after a driver assistance function.
15. The method according to claim 13, wherein the requirements (FAS) are configured to change a steering angle.
16. The method according to claim 15, wherein changes ($\varphi_{FAS}$) to the steering rack position due to requirements (FAS) are subtracted for the determination of the feedback torque ($M_{FF}$).

17. The method according to claim 13, further comprising detecting, via the steering control unit, requirements (FAS) by a driver assistant system.

18. The method according to claim 17, wherein the requirements (FAS) comprise a reset torque ($M_{FAS}$) that is subtracted from the hand torque ($M_H$) by the steering control unit.

* * * * *